United States Patent
Sole et al.

(10) Patent No.: US 10,897,892 B1
(45) Date of Patent: Jan. 26, 2021

(54) PASSIVELY REGULATED CONTROLLED COOLING RATE VIAL HOLDING APPARATUS AND METHOD FOR CONTROLLING COOLING RATES

(71) Applicant: Mainstream Engineering Corporation, Rockledge, FL (US)

(72) Inventors: Joshua D. Sole, Rockledge, FL (US); Thomas M. Lasko, Merritt Island, FL (US); Jeffrey A. Milkie, Melbourne, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 215 days.

(21) Appl. No.: 16/133,086

(22) Filed: Sep. 17, 2018

(51) Int. Cl.
| | | |
|---|---|---|
| *A01N 1/02* | (2006.01) | |
| *B01L 9/06* | (2006.01) | |
| *B65D 81/18* | (2006.01) | |
| *G01N 1/42* | (2006.01) | |

(52) U.S. Cl.
CPC ............ *A01N 1/0268* (2013.01); *B01L 9/06* (2013.01); *A01N 1/0252* (2013.01); *B65D 81/18* (2013.01); *G01N 1/42* (2013.01)

(58) Field of Classification Search
None
See application file for complete search history.

(56) References Cited

U.S. PATENT DOCUMENTS

| | | | | |
|---|---|---|---|---|
| 3,108,840 A | * | 10/1963 | Conrad | F25D 25/00 312/400 |
| 4,455,842 A | * | 6/1984 | Granlund | A01N 1/02 62/64 |
| 5,105,627 A | * | 4/1992 | Kurita | A01N 1/02 62/337 |
| 5,934,099 A | | 8/1999 | Cook et al. | |
| 5,950,832 A | * | 9/1999 | Perlman | B01L 9/06 206/446 |
| 5,956,968 A | | 9/1999 | Grabowski | |
| 7,604,930 B1 | | 10/2009 | Gao et al. | |
| 9,078,429 B2 | | 7/2015 | McGann et al. | |
| 9,534,992 B2 | | 1/2017 | Schryver et al. | |
| 2012/0325826 A1 | | 12/2012 | McCormick | |
| 2013/0091890 A1 | * | 4/2013 | Schryver | B01L 7/50 62/440 |
| 2014/0335614 A1 | | 11/2014 | Schryver | |
| 2015/0024487 A1 | | 1/2015 | Cheng et al. | |
| 2015/0027434 A1 | | 1/2015 | Murphy | |
| 2015/0352553 A1 | * | 12/2015 | Beer | C12M 29/00 435/286.1 |

(Continued)

OTHER PUBLICATIONS

Lide, CRC Handbook of Chemistry and Physics, Internet Version 2005, 2005, CRC Press, p. 12-195 (Year: 2005).*

(Continued)

*Primary Examiner* — Holly Kipouros
(74) *Attorney, Agent, or Firm* — Michael W. O'Neill, Esq.

(57) ABSTRACT

An apparatus holds or stores at least one vial containing a vaccine or other material to be cryogenically preserved. The method passively regulates the rate of cooling for vaccines or other cryopreserved materials by using the enthalpy of fusion of at least one phase-change material (PCM) to control the rate of cooling when subject to a low temperature or cryogenic storage environment.

6 Claims, 10 Drawing Sheets

(56) References Cited

U.S. PATENT DOCUMENTS

2016/0348060 A1* 12/2016 Joaquim Rodrigues ...................... C12M 41/34
2017/0241702 A1* 8/2017 Klett ..................... F25B 23/006

OTHER PUBLICATIONS

Fellows, Food Processing Technology, Fourth Edition, 2017, Woodhead Publishing (Year: 2017).*

Kumar et al., Liquid nitrogen with metal oxide nanoparticles for cooling of micro-electronic devices, Jul. 2017, International Journal of Mechanical Engineering and Technology, vol. 8 Issue 7, pp. 1284-1291 (Year: 2017).*

A simple and efficient method for cryopreservation and recovery of viable Plasmodium vivax and P. falciparum sporozoites; Naresh Singh a, Samantha J. Barnes a, Rachaneeporn Jenwithisuk b, Jetsumon Sattabongkot b, John H. Adams.

The cryopreservation of composites tissues—Principles and recent advancement on cryopreservation of different type of tissues; Joseph Bakhach U.m.l Urgence Main Liban; Bellevue Medical Center; Mansourieh, Beirut Lebanon.

Eukaryotic Cell Storage and Retrieval at −80C: The Evidence for and Against Long Term Survival Rates; Robin A. Felder, Ph.D., Professor of Pathology, Director, Medical Automation Research Center.

Mechanisms of Cryoinjury in Living Cells; Doyong Gao andJ. K. Critser—(Abstract).

Thermo Scientific Nalgene Mr. Frosty Freezing Container; Product Specifications—Designed for use with the entire portfolio of Thermo Scientific Nunc and Nalgene ryogenic storage tubes, Nalgene® Mr. Frosty® freezing containers provide simple cooling of samples at the optimal rate to preserve cells.

* cited by examiner

PASSIVELY REGULATED CONTROLLED COOLING RATE VIAL HOLDING APPARATUS AND METHOD FOR CONTROLLING COOLING RATES

GOVERNMENT RIGHTS

This invention was made with Government support under contract W81XWH-8-C-0075 awarded by the U.S. Army. The Government has certain rights in the invention.

BACKGROUND AND SUMMARY OF THE INVENTION

The present invention relates to an apparatus that holds one or more than one vials containing a vaccine that is designed for cooling at a controlled rate to cryogenic temperatures (herein defined as −80° C. or lower), short- or long-term storage at cryogenic temperatures, transportation or distribution at cryogenic temperatures, and/or thawing of the vaccine from cryogenic temperatures. Vaccine used in the several hereinafter described embodiments of the present invention refers to eukaryotic vaccines but is also intended to include other types of vaccines, pharmaceuticals, or biological materials that benefit from controlled cooling rates and storage at cryogenic temperatures and any combination of the above listed with a one or more cryopreservatives.

Cryopreservation of certain eukaryotic vaccines, pharmaceuticals, and biological materials requires cooling specimens from room temperature (~20° C.) down to cryogenic temperatures for short- and long-term storage and/or distribution. The rate of cooling, more specifically the rate of cooling through the freezing point of the vaccine, has been identified in the literature as a critical parameter for the survivability and viability of the vaccine after cryogenic storage and thaw. The vaccine freezing point is typically near 0° C., but may be significantly warmer or colder depending on the vaccine and cryo-preservative used. A cryo-preservative is any material which is selected or used to increase the survivability of the vaccine during cryogenic preservation. The optimal cooling rate can differ depending on both the vaccine and cryo-preservative used but can be predetermined independently for each vaccine and cryo-preservative pair. A cooling rate that is too fast will cause damage to the cells, thereby decreasing survivability. A cooling rate that is too slow will result in dehydration of the cells, thereby also decreasing survivability. Therefore, a tightly controlled cooling rate is required for optimal survivability. In many cases, the desired cooling rates are very low (0.5° C./min to 30° C./min). Once frozen, the vaccine must be maintained at cryogenic temperatures for storage and distribution. Thawing should only occur once, immediately prior to the end use of the vaccine. Intermediate thawing or appreciable warming, even temporarily, can decrease survivability of the vaccine.

Long term storage and distribution for these vaccines are typically at liquid nitrogen or liquid nitrogen vapor phase (LNVP) temperatures (−196° C. to −140° C.) due to the convenience of liquid nitrogen availability but can also be as high as −80° C. Due to the large temperature difference between the initial temperature (~20° C.) and the desired storage temperature, initial heat transfer rates are very high. To further complicate the cooling, the volume of the vaccine aliquot that is stored in each vial is typically 20 to 500 μL. The low thermal mass of the aliquot combined with the very large initial temperature difference between the aliquot and cryogenic storage vessel results in very rapid cooling rates (>30° C./min). Thus, limiting the cooling rate to 0.5° C./min to 30° C./min can be quite challenging.

One approach in the prior art used to control of the cooling and freezing rates of vaccines is a controlled-rate freezer. In this embodiment, vials can be placed directly into the controlled-rate freezer or into a container which is placed into a controlled-rate freezer. These are expensive mechanical or liquid nitrogen supplied freezers that tightly monitor and control the cooling rate of the contents of the freezer to a user specified cooling rate. Using this approach, vaccine freezing must be completed in a batch process. A warm container of vaccine vials cannot be added to the controlled-rate freezer after cooling of a prior batch of vials has started until the freezer has reached the minimum temperature and the first container of vaccine vials has been completely frozen, removed, and placed in long-term storage and the controlled-rate freezer temperature has been increased to room temperature.

A second known approach used to control the cooling and freezing rates of vaccines uses an intermediate temperature freezer, either a mechanical −80° C. freezer or dry ice freezer (about −80° C.). Vials are placed into a container designed to reduce the cooling rate to −1° C./min and cooled to −80° C. One such embodiment uses thick insulation surrounding the vial container to reduce the heat transfer rate. Insulation thickness can be varied to change the cooling rate to multiple values. A second known embodiment uses a volume of liquid isopropyl alcohol to add thermal mass to the container to slow the cooling rate. Both known embodiments of this type typically have a lower number of vials per volume than the vial holding containers which do not regulate the cooling rate due to the container shape (typically cylindrical) and/or use of thick insulation. This, in turn, requires more vial trays and more cryogenic storage volume to freeze, store, and distribute a given number of vials. Standard freezer vial tray racks have twelve −5.25"×5.25"×2.25" (L×W×H) openings. Both known embodiments exceed the height dimension of this standard rack, reducing the number of vial trays per rack.

Current known freezing rate control methods require a multistep freezing-and-storage process as well as requiring the vials containing the vaccine to be moved between one or more intermediate locations, at one or more temperatures before reaching cryogenic storage. Cooling and freezing occurs in one or more devices, such as a controlled-rate freezer or −80° C. freezer. The vials or container of vials must then be transferred to a cryogenic storage device for short- or long-term storage, which further cools the vials and vaccines. Each transition from one location to a second location or between vial containers requires additional equipment, additional time, and represents a chance for the vaccine to warm sufficiently to decrease the survivability of the vaccine.

We have discovered a controlled freezing rate vial containing device that allows for a single step freezing process that directly places the vials containing vaccine in a LNVP repository or other cryogenic storage vessel, eliminating all intermediate steps. The controlled freezing rate vial containing device combines a plurality of storage containers for freezing, short- or long-term storage, and distribution/transportation into a single device that fits into a standard vial tray rack slot. The present invention is designed to hold, by gravity, friction, or other mechanisms, a plurality of vials containing vaccine. Our apparatus can control the cooling rate to a predetermined rate between 0.5° C./min and 30° C./min, over the critical range of temperatures approaching the freezing point of the vaccine as the vials with vaccine are cooled from room temperature (20° C. or warmer) down to cryogenic temperature (−80° C. or lower) and remain at cryogenic temperatures until distribution or use. Additionally, because our apparatus is placed directly into cryogenic storage, the need for batch process cooling is eliminated.

Our controlled-freezing-rate-vial containing device uses one or more solid-liquid phase change materials (PCMs) contained in the vial holding apparatus to slow the vaccine cooling and freezing rate to the target rate over the critical temperature range identified for each vaccine by selecting or tailoring the one or more PCMs (hereinafter PCM(s)). As the vaccine approaches the freezing point, the device uses the exothermic freezing (heat of fusion) of the selected or tailored PCM(s) to passively reduce the cooling rate of the vaccine aliquot. The freezing point of the PCM(s) may be above, equal to, or below the freezing point of the vaccine based on the thermal conductivity of the vial, vial holding apparatus and PCM(s), and the contact resistances between the vial, vial holding apparatus, and PCM(s). Our experiments have verified that changing the PCM(s) effectively alters the cooling rate of the vaccine to a targeted uniform cooling rate.

Our vial holding apparatus which contains the PCM(s) can be made from any pure or composite material with a thermal conductivity greater than 0.1 W m$^{-1}$ K$^{-1}$, capable of maintaining mechanical integrity at cryogenic temperatures, for example aluminum, copper, stainless steel, polypropylene, or polycarbonate. Modifying the thermal conductivity of the vial holding apparatus, in combination with selection or tailoring of the PCM(s), can be used to adjust the vaccine cooling rate. A combination of high and low thermal conductivity materials may be used to increase the uniformity of cooling rates among vials in the device and minimize the difference in freezing times of vials in different locations within the vial holding apparatus.

For maximum vial packing density, a square vial holding apparatus that fits within the dimensions of a standard vial tray rack is ideal. Alternate vial holding apparatus geometries containing PCM(s) including round, rectangular, or others may, however, be advantageous to achieve certain cooling rates. The present invention also addresses the issue of low vial packing in a storage device and can hold at least four times the number of vials per standard vial tray rack as those known in the prior art.

The PCM(s) used in the several embodiments of the present invention described below can be water, paraffin wax, fatty acids, hydrated salts, metals, eutectic mixtures, any other organic or inorganic substance that undergoes a phase change or other type of latent energy storage and release in a temperature range of −200° C. to +35° C., or any combination thereof. The PCM(s) can be in a pure form or can contain additives to improve the thermal conductivity, nucleating agents to reduce supercooling, and/or thickening agents to minimize separation or stratification. In one currently preferred embodiment, the PCM(s) is a low concentration aqueous solution of dimethyl sulfoxide (DMSO) or ethanol.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
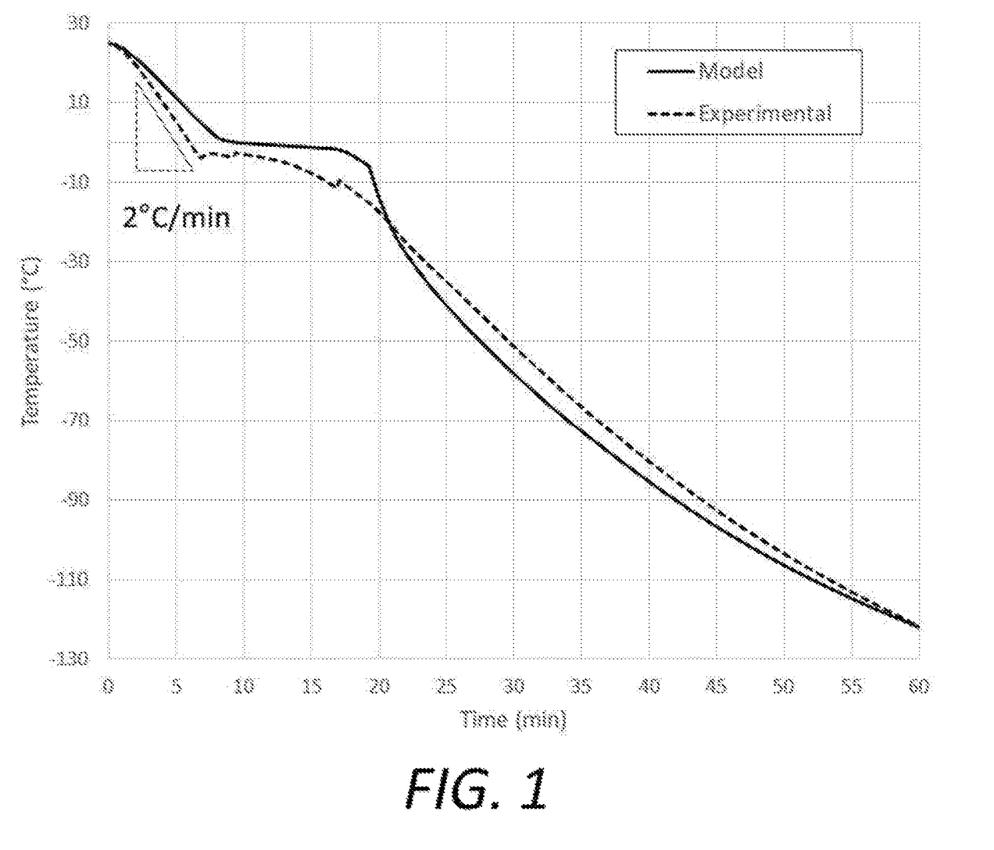
FIG. 1 shows a plot of experimental measurements and computational model predictions of the vaccine temperature versus time that results from placing one embodiment of the present invention with vials filled with vaccine in a LNVP repository.
Figure 2:
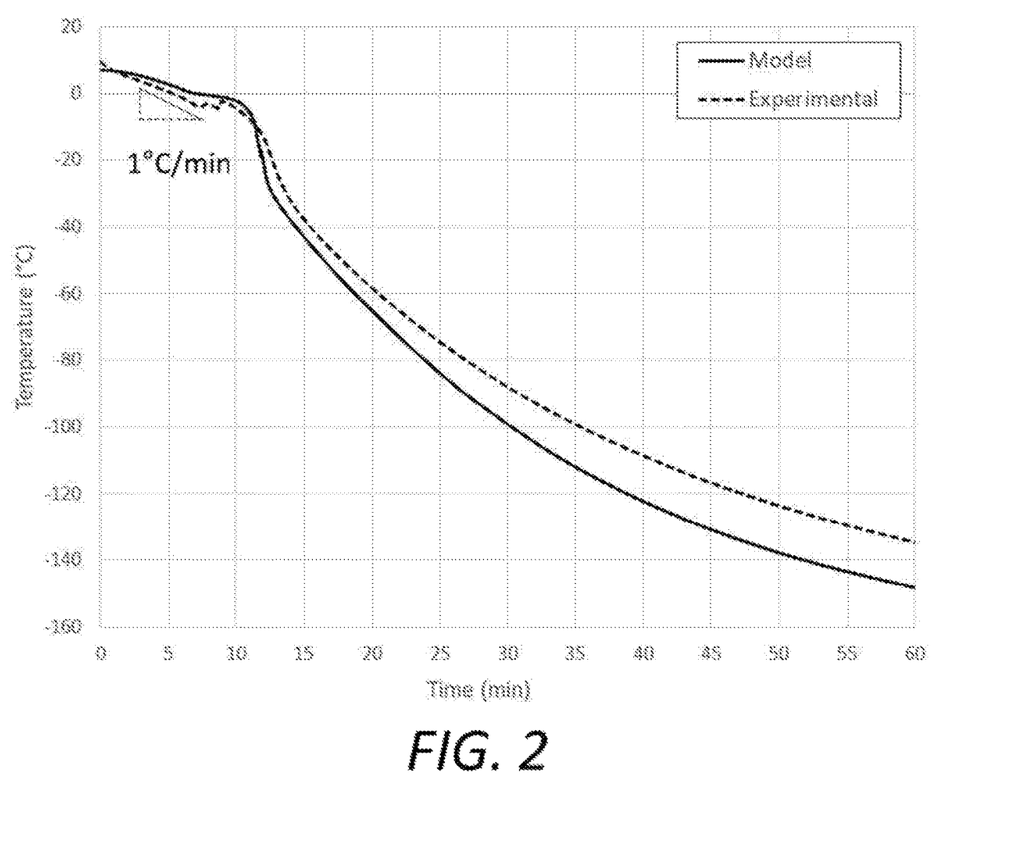
FIG. 2 shows a plot of experimental measurements and computational model predictions of the vaccine temperature versus time that results from placing a second embodiment of the present invention with vials filled with vaccine in a LNVP repository.

Referring to FIG. 1, the computational model prediction and experimentally measured vaccine temperature versus time are presented graphically for one embodiment of the present invention placed in a LNVP repository and cooled from room temperature to cryogenic temperatures. The experimentally measured cooling rate of 2° C./min is reasonably predicted by the computational model. The computational model prediction and experimentally measured vaccine temperature versus time are presented graphically for a second embodiment of the present invention in FIG. 2. The second embodiment was predicted by the computational model and measured experimentally to have a lower cooling rate of 1° C./min. The difference between the first and second embodiments that resulted in two different cooling rates, is the use of a different PCM. FIG. 2, in comparison to FIG. 1, illustrates the ability to tailor the PCM material to control the cooling and freezing rate. FIG. 1 and FIG. 2 also illustrate the ability of computational models accurately to predict the experimental cooling rates. Therefore, a computational optimization can be used to identify the appropriate PCM(s) for each vaccine.

Figure 3:
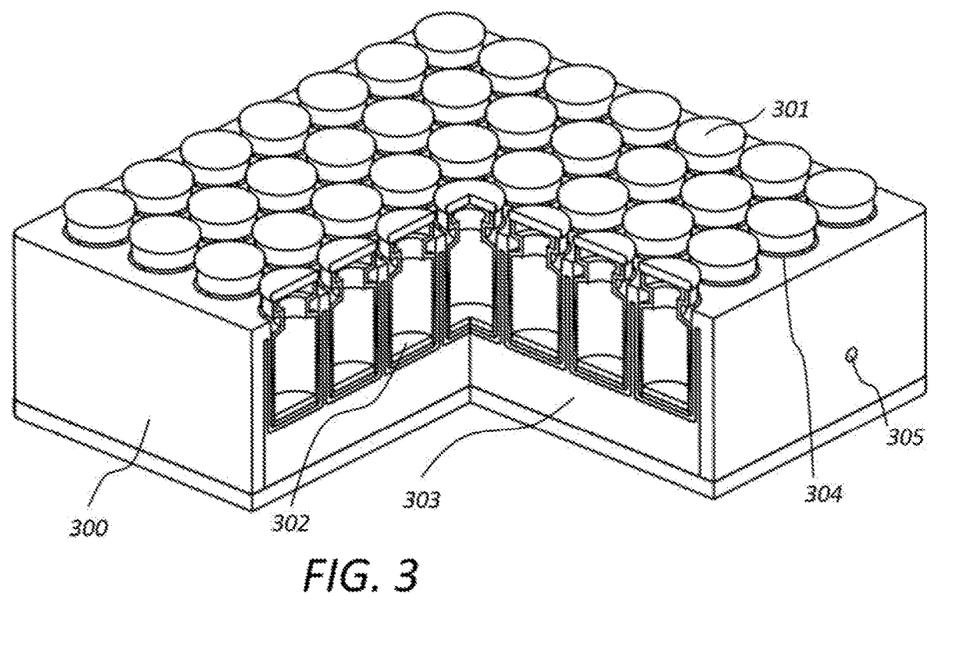
FIG. 3 is a schematic partial-sectional perspective view of one currently contemplated embodiment of the present invention configured as a vial holding apparatus with a single PCM material filling the internal cavity of the vial holding body.

As shown in FIG. 3, one embodiment of our controlled-cooling-rate vial holding device comprises a vial holding body 300, one or more vials 301 containing a vaccine aliquot 302, and PCM(s) material 303 completely contained inside of the vial holding body 300. The vial holding body 300, has one or more than one vial holding compartments 304. Each vial holding compartment 304 can hold a single vial 301. The vial holding body 300 can be constructed as a single piece or of multiple pieces (as in the embodiment of FIG. 12 described below) and may contain one or more filling port(s) 305 for the introduction of the PCM(s) 303. The vial 301 can be partially inserted or completely inserted into the vial holding body such that the between 5 and 100% of the vial is inserted. The portion of the vial containing the vaccine aliquot 302 is, however, completely enclosed within the vial holding body 300. The vial holding body components can be a single material or a composite body of one or more materials and have a thermal conductivity greater than 0.1 W m$^{-1}$ K$^{-1}$. The vial holding body 300 can be formed through molding, bolted components, brazed components, welded components, diffusion bonded components, adhesive bonded components, or additive manufacturing methods such as 3-D printing that melt powders or filaments to produce 3-D structures and the like to produce the desired apparatus configuration. The device can be filled with one PCM 303 through the fill port(s) 305 to achieve one cooling rate, then the same device can be drained of the first PCM through the fill port(s) 305, cleaned, and refilled with a second PCM to achieve a second cooling rate. Alternatively, once the vial holding body 300 has been filled with a PCM 303 through the fill port 305, the fill port 305 can be permanently sealed via welding, an adhesive, a threaded fastener, or other sealing technique. For a fixed vial holding apparatus geometry as shown in FIG. 3, if a low concentration aqueous solution of dimethyl sulfoxide (DMSO) is used as the PCM(s), changing the concentration of DMSO in the aqueous PCM alters the PCM(s) melting point and heat of fusion which results in different cooling rates prior to the vaccine aliquot freezing (Table 1) below.

TABLE I

Impact of DMSO concentration in an aqueous PCM solution on PCM melting point, PCM heat of fusion, and vaccine aliquot cooling rate.

| DMSO concentration (%, by volume) | Melting Point (K) | Heat of Fusion (J/g) | Aliquot Cooling Rate (° C./min) |
|---|---|---|---|
| 1 | 271.0 | 306 | 1.0 |
| 3 | 269.9 | 274 | 1.4 |
| 5 | 268.9 | 247 | 3.2 |
| 9 | 266.8 | 209 | 4.5 |
| 15 | 263.6 | 190 | 5.0 |

Figure 4:
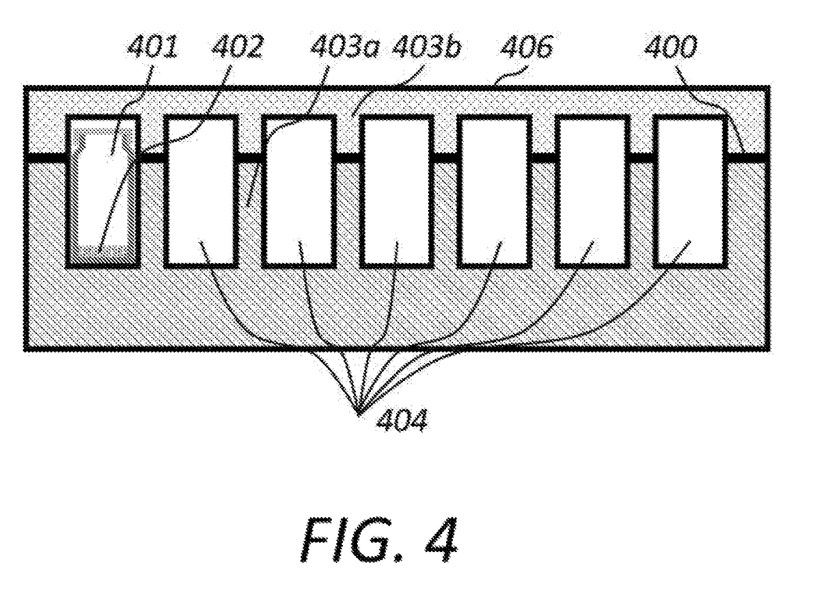
FIG. 4 is a schematic cross-sectional perspective view of one currently contemplated embodiment of the present invention in which the PCM(s) material is completely contained inside of a hollow portion of the vial holding body.

As shown in FIG. 4, a schematic cross-sectional perspective view of one currently contemplated embodiment of the controlled cooling rate vial holding device is shown that includes a vial holding body 400, one or more vials 401 containing a vaccine 402, and PCM(s) 403a completely contained inside of the hollow portion of the vial holding body 400. The vial holding body 400, has one or more than one vial holding spaces 404. Each vial holding space 404 can hold a single vial 401. The controlled rate vial holding device can be configured with a lid 406 or without a lid. The lid may also contain PCM(s) 403b, which may or may not be the same PCM(s) in the vial holding body 403a.

Figure 5:
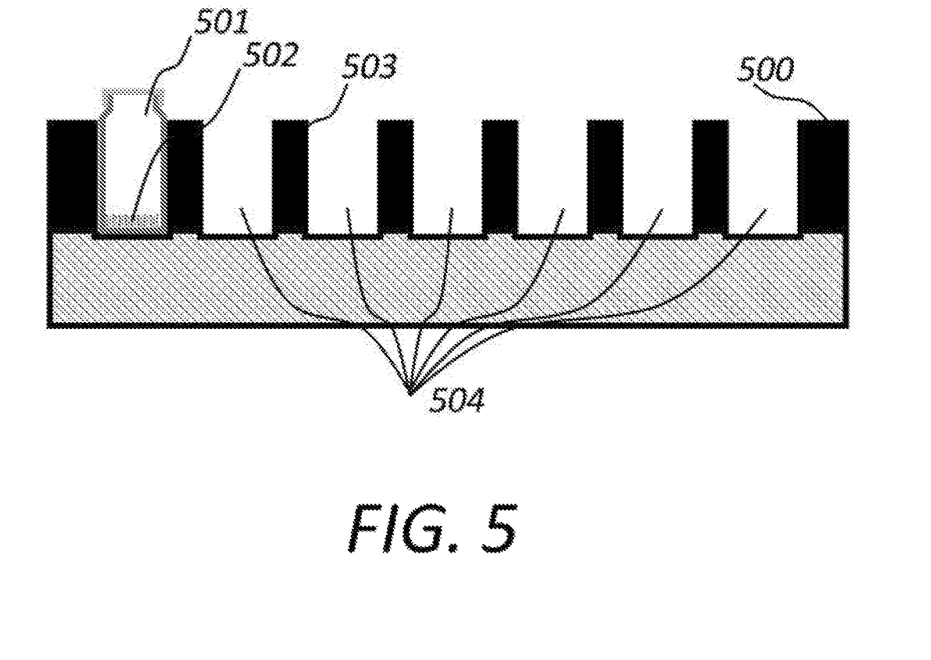
FIG. 5 is a schematic cross-sectional perspective view of a second currently contemplated embodiment of the present invention in which the PCM(s) material is constrained to a region below the vials.

As shown in FIG. 5, a schematic cross-sectional perspective view of one currently contemplated embodiment of the controlled cooling rate vial holding device is shown that includes a vial holding body 500, one or more vials 501 containing a vaccine 502, one or more PCM(s) 503 completely contained inside the internal cavity of the vial holding body 500. In this second embodiment, the PCM(s) are constrained to only below the vials 501. The vial holding body 500, has one or more than one vial holding spaces 504. Each vial holding space 504 can hold a single vial 501. In this embodiment the vial holding body 500 is solid between the vial holding spaces 504. Any portion of the internal cavity can made from a non-PCM material, such as the same material as the vial holding body 500 to improve thermal conduction to more uniformly cool the vials. Increasing or decreasing the internal cavity and PCM(s) volume in this way also can be used to "tune" the cooling rate. That is, customized cooling rates can be achieved that are optimized for various materials.

Figure 6:
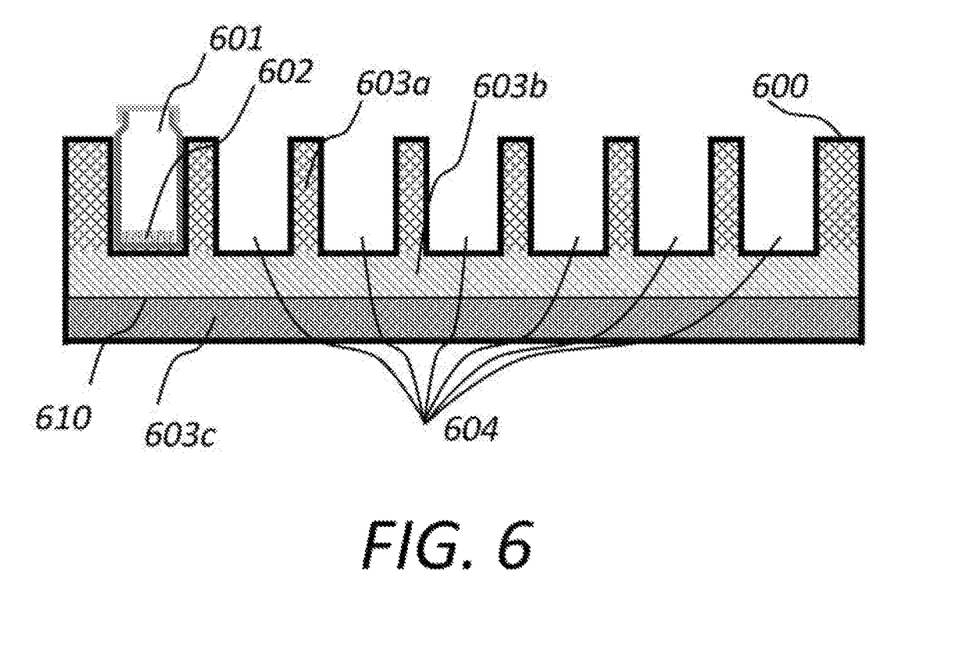
FIG. 6 is a schematic cross-sectional perspective view of a third currently contemplated embodiment of the present invention in which the PCM(s) fill the internal cavity of the vial holding body in a layered or stacked configuration.

As shown in FIG. 6, a third currently contemplated embodiment of our controlled-cooling-rate vial holding device is shown that includes a vial holding body 600, one or more vials 601 containing a vaccine 602, and PCM(s) 603a, 603b, and 603c completely contained inside the internal cavity of the vial holding body 600. The vial holding body 600 can also be configured as shown in FIG. 5 with varied internal cavity volume. The vial holding body 600 has one or more than one vial holding spaces 604. Each vial holding space 604 can hold a single vial 601. The PCM(s) 603a, 603b, and 603c fill the internal cavity of the vial holding body 600 in a layered or stacked configuration. Material properties such as density, or an optional physical barrier 610 can be used to maintain the PCM layers. The two or more PCM(s) 603a, 603b, and 603c can be different PCMs or the same PCM with different additives or different concentrations of the same additive. The cooling rate can be tuned to the desired target cooling rate. More than three PCMs can also be used in the configuration shown.

Figure 7:
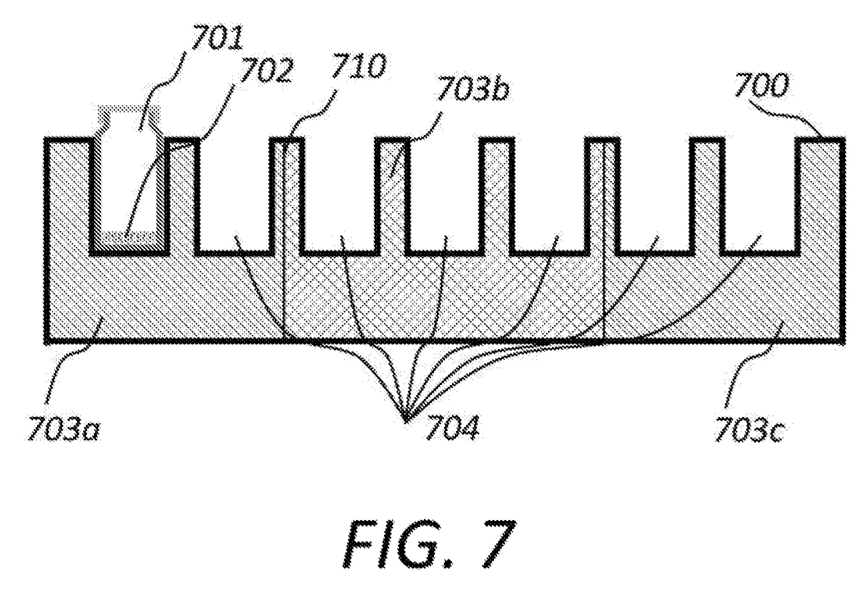
FIG. 7 is a schematic cross-sectional perspective view of a fourth currently contemplated embodiment of the present invention in which the PCM(s) fill the internal cavity of the vial holding body in segments.

As shown in FIG. 7, a fourth currently contemplated embodiment of the controlled cooling rate vial holding device includes a vial holding body 700, one or more vials 701 containing a vaccine 702, PCM(s) 703a, 703b, and 703c completely contained inside the internal cavity of the vial holding body 700. The vial holding body 700 can also be configured as shown in FIG. 5. The vial holding body 700, has one or more than one vial holding spaces 704 with each vial holding space 704 holding a single vial 701. The PCM(s) 703a, b, and c fill the internal cavity of the vial holding body 700 in segments. A physical barrier 710 may or may not be used to maintain the PCM segments. The two or more PCM(s) 703a, b, and c can be different PCMs or the same PCM with different additives or different concentrations of the same additive. This embodiment can be used to improve the uniformity of the cooling rate of all vials. More than three PCMs can also be used in this embodiment.

Figure 8:
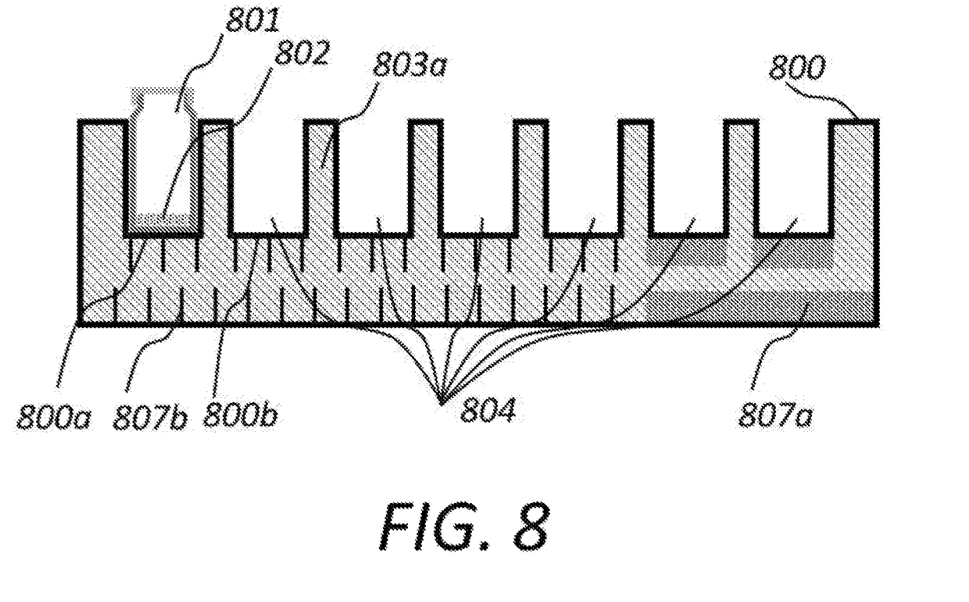
FIG. 8 is a schematic cross-sectional perspective view of a fifth currently contemplated embodiment of the present invention in which at least one thermal conductivity enhancement mechanism such as graphite or metal foam or fins extending from the bottom surface internally of the vial holding body or from the bottom of the vial holding space of the vial holding body.

As shown in FIG. 8, a fifth currently contemplated embodiment of the controlled cooling rate vial holding device includes a vial holding body 800, one or more vials 801 containing a vaccine 802, and PCM(s) 803 completely contained inside the internal cavity of the vial holding body 800. The vial holding body 800 can also be configured as the embodiment shown in FIG. 5. The vial holding body 800 has one or more than one vial holding spaces 804. Each vial holding space 804 can hold a single vial 801. Internal to the vial holding body 800 is one or more thermal conductivity enhancement mechanism such as graphite or metal foam 807a, or fins 807b that can be folded or wavy metal fins, pin fins, lanced fins, offset fins, or other types of fins extending from the bottom surface 800a of the vial holding body or from the bottom 800b of the vial holding space of the vial holding body. The distribution of fins internal to the vial holding body can be uniform as shown but may also vary by distance from one or more of the outer surfaces of the vial holding body 800. This fifth embodiment improves the thermal conduction through the PCM(s) and can be used to tune the cooling rate or improve the uniformity of vial cooling.

Figure 9:
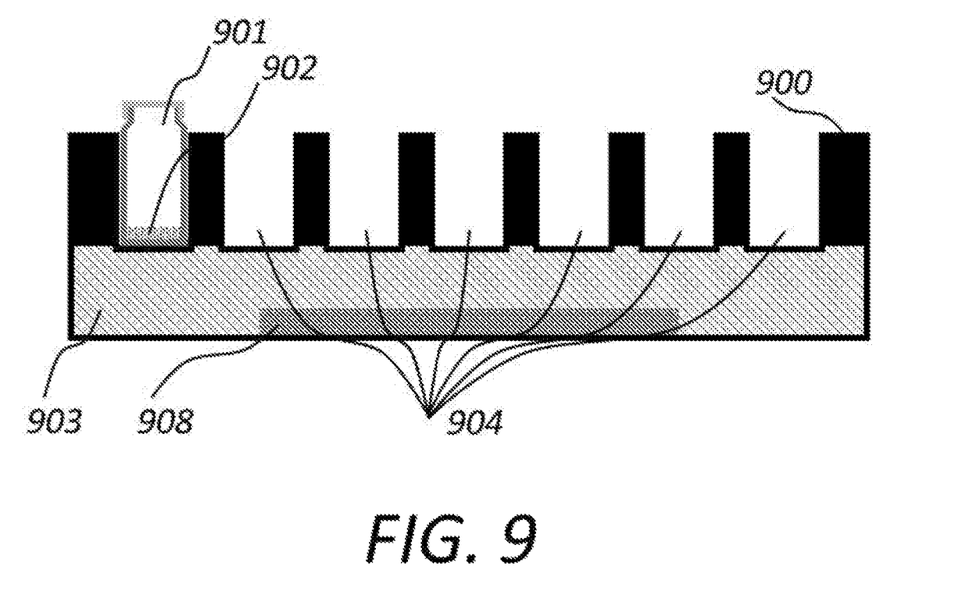
FIG. 9 is a schematic cross-sectional perspective view of a sixth currently contemplated embodiment of the present invention in which the vial holding body contains a compressible material.

As shown in FIG. 9, a sixth currently contemplated embodiment of the controlled cooling rate vial holding device includes a vial holding body 900, one or more vials 901 containing a vaccine 902, and PCM(s) 903 completely contained inside the internal cavity of the vial holding body 900. The PCM(s) material 903 fills the internal cavity of the vial holding body 900 which contains a compressible material 908. The vial holding body 900 has one or more than one vial holding spaces 904. Each vial holding space 904 can hold a single vial 901. The inclusion of a compressible material 908 in this and the previously described embodiments of our invention compensates for thermal expansion or contraction of the PCM during freezing or thawing to prevent damage to the vial holding tray and also ensures continuous contact between the PCM(s) and the vial holding body on all surfaces. Closed-cell elastomeric foam with minimal compression set that maintains elasticity at cryogenic temperatures is currently preferred for the compressible material 908 but other compressible materials can also be used. The compressible material 908 can be located on the bottom interior surface of the vial holding body 900 as shown or can be contained in any other location within the hollow portion of the vial holding body 900.

Figure 10:
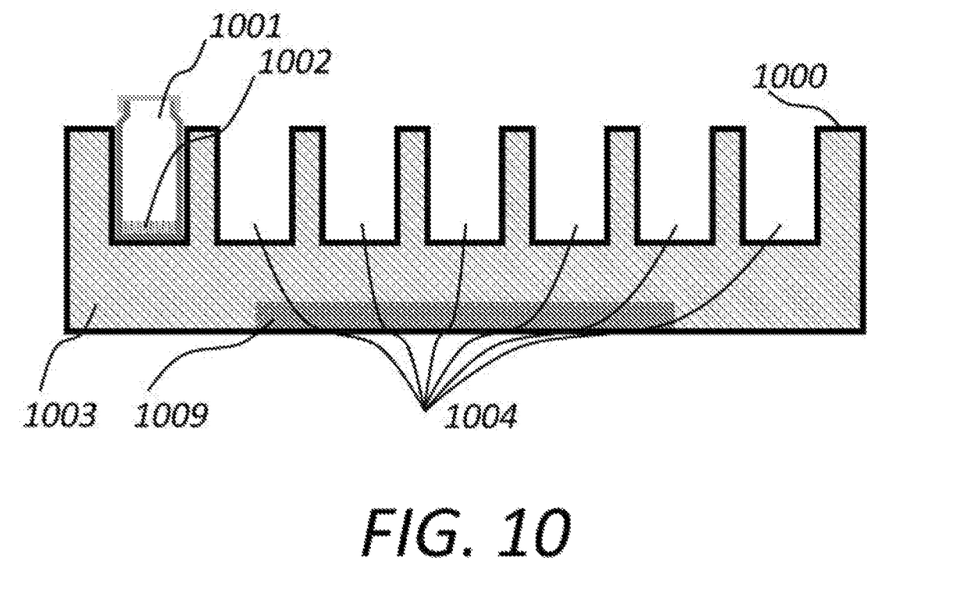
FIG. 10 is a schematic cross-sectional perspective view of a seventh currently contemplated embodiment of the present invention in which the vial holding body contains at least one secondary material having a selectively higher or lower thermal conductivity than the vial holding body.

FIG. 10 shows a seventh currently contemplated embodiment of the controlled cooling rate vial holding device that includes a vial holding body 1000, one or more vials 1001 containing a vaccine 1002, and PCM(s) material 1003 completely contained inside the internal cavity of the vial holding body 1000. The PCM(s) 1003 fills the internal cavity of the vial holding body 1000 which contains one or more secondary materials 1009 having a selectively higher or lower thermal conductivity than the vial holding body 1000 to improve the uniformity of the cooling rate between vials. The vial holding body 1000 has one or more than one vial holding spaces 1004. Each vial holding space 1004 can hold a single vial 1001. The secondary material 1009 can be incorporated into any of the other embodiments.

Figure 11:
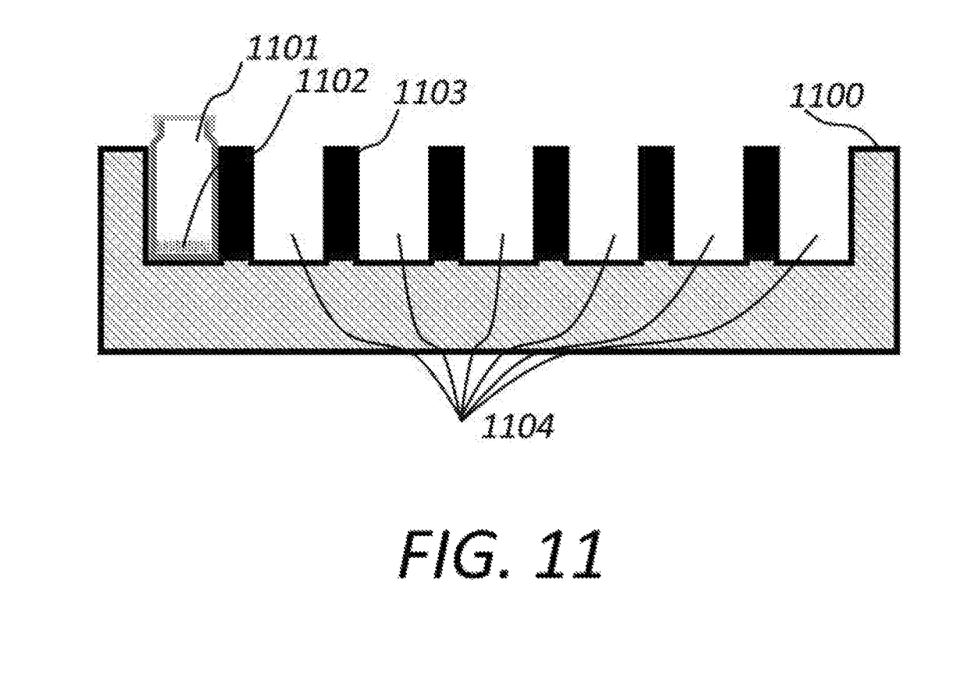
FIG. 11 is a schematic cross-sectional perspective view of an eighth currently contemplated embodiment of the present invention in which the PCM material fills the internal cavity of the vial holding body which extends around the perimeter of the tray and below the vials.

FIG. 11 shows an eighth currently contemplated embodiment of the controlled cooling rate vial holding device that includes a vial holding body 1100, one or more vials 1101 containing a vaccine 1102, and PCM(s) material 1103 completely contained inside the internal cavity of the vial holding body 1100. The PCM(s) material 1103 fills the internal cavity of the vial holding body 1100 which extends around the perimeter of the tray and below the vials. The vial holding body 1100 has one or more than one vial holding spaces 1104. Each vial holding space 1104 can hold a single vial 1101.

Figure 12:
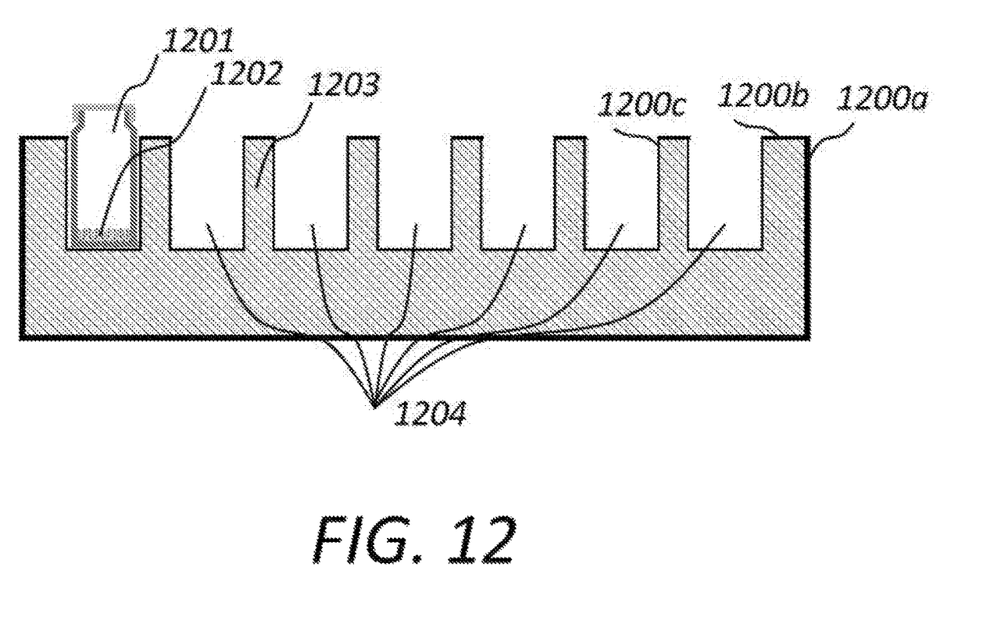
FIG. 12 is a schematic cross-sectional perspective view of a ninth currently contemplated embodiment of the present invention in which the vial holding body is a composite of multiple pieces.

Finally, FIG. 12 shows a ninth currently contemplated embodiment of the controlled cooling rate vial holding device that includes a vial holding body that is comprised of multiple separate pieces 1200a, 1200b, and 1200c, one or more vials 1201 containing a vaccine 1202, and PCM(s) material 1203 completely contained inside the internal cavity of the vial holding body 1200a, 1200b, and 1200c. The PCM(s) material 1203 fills the internal cavity of the vial holding body 1200. The vial holding body 1200a, b, and c has one or more than one vial holding spaces 1204. Each vial holding space 1204 can hold a single vial 1201. The components which comprise the vial holding body 1200a, 1200b, and 1200c may be the same or different materials.

One skilled in the art will now also recognize, that the above described embodiments can be configured to hold multiple vial sizes and vial types and fit into multiple vial tray rack sizes. While we have shown currently preferred embodiments of the present invention, it is to be understood that the same is not limited to the details shown and described above. Therefore, we do not intend to be limited to the details shown and described but intend to cover all such changes and modifications as are encompassed by the scope of the appended claims.

We claim:

1. A controlled cooling rate vial containing device for allowing a single step freezing process that directly places a plurality of vials containing a vaccine or vaccine aliquot in a liquid nitrogen vapor phase (LNVP) repository or a cryogenic storage vessel, comprising:
   a vial holding body having an interior cavity formed from a plurality of surfaces and having a plurality of vial-holding compartments configured to hold the plurality of vials containing the vaccine or vaccine aliquot;
   at least one phase change material (PCM) within the interior cavity of the vial holding body and the at least one PCM is configured to control the cooling rate of the vaccine or vaccine aliquot within the plurality of vials inserted into the plurality of vial-holding compartments within the vial holding body;
   at least one or more thermal conductivity enhancement mechanisms distributed within the interior cavity of the vial holding body, wherein the distribution of the at least one or more thermal conductivity enhancement mechanisms at least tunes the cooling rate or improves the uniformity of the cooling of the vaccine or vaccine aliquot contained within the plurality of vials inserted into the plurality of vial-holding compartments within the vial holding body;
   wherein the at least one thermal conductivity enhancement mechanisms comprises a plurality of fins extending from at least one of the plurality of surfaces forming the interior cavity of the vial holding body.

2. The controlled cooling rate vial containing device of claim 1, wherein the at least one thermal conductivity enhancement mechanisms comprise also a graphite foam within the PCM.

3. The controlled cooling rate vial containing device of claim 1, wherein the at least one thermal conductivity enhancement mechanisms comprise also a metal foam within the PCM.

4. The controlled cooling rate vial containing device of claim 1, wherein the at least one thermal conductivity enhancement mechanisms comprise also a closed-cell elastomeric foam within the PCM.

5. The controlled cooling rate vial containing device of claim 1, wherein the at least one thermal conductivity enhancement mechanisms comprise also a secondary material selected to have either a higher or lower thermal conductivity than the vial holding body and the secondary material is within the PCM.

6. The controlled cooling rate vial containing device of claim 1, further comprising:
   the vial holding body having at least one fill port to permit different cooling rate PCMs to fill the interior cavity and then be drained so a to change the cooling rate of the controlled cooling rate vial containing device.

* * * * *